United States Patent Office 3,578,635
Patented May 11, 1971

3,578,635
LACQUER COMPOSITIONS COMPRISING HALOGENATED CARBON BLACK
John F. Hardy, 1 Beach Circle, Andover, Mass. 01810; Donald Rivin, 4 Woodward Road, Framingham, Mass. 01701; and Jerome Aron, 61 Pinehurst Ave., Providence, R.I. 02908
No Drawing. Continuation-in-part of application Ser. No. 799,950, Feb. 17, 1969, which is a continuation-in-part of application Ser. No. 556,869, June 13, 1966. This application Aug. 12, 1969, Ser. No. 849,523
Int. Cl. C09d *3/64, 3/74*
U.S. Cl. 260—22                                7 Claims

ABSTRACT OF THE DISCLOSURE

This disclosure relates to the use of certain halogenated carbon blacks as pigments in the preparation of paint and lacquer compositions which possess excellent non-flooding properties and excellent tinting properties.

---

This application is a continuation-in-part of copending application Ser. No. 799,950, filed Feb. 17, 1969, now U.S. Pat. No. 3,539,372 issued Nov. 10, 1970, which in turn is a continuation-in-part of application Ser. No. 556,869, filed June 13, 1966, now abandoned.

This invention relates to new and useful halogenated carbon black-containing paint and lacquer compositions and a process for preparing certain of said halogenated carbon blacks. In particular, this invention relates to new and improved paint compositions containing a halogenated carbon black which compositions have excellent non-flooding and excellent tinting characteristics.

Heretofore, a problem that has continually accompanied the utilization of carbon blacks in gray pigments is the phenomenon known as "flooding." The flooding phenomenon is characterized by a separation of the carbon black pigment from the other pigments used in the preparation of gray paint compositions. The separation is caused, in part, by the lower density of carbon black in comparison with the other compounding pigments employed in the paint composition such as titanium dioxide, and, in part, by the flocculation of carbon black. The troublesome aspects of the flooding phenomenon become particularly acute in the case of an article having surfaces which have been coated by spraying with gray paint and other surfaces which have been coated by dipping the article into the same gray paint. In such an instance, upon the occurrence of the flooding phenomenon, the carbon black pigment of the paint composition tends to sink from or float to the top of the dip-coated surfaces and thereby provides an undesirable color contrast with the spray-coated surfaces. Paint users object to this color contrast of the surface and, accordingly, carbon blacks which avoid segregation in gray paint compositions are in demand and command a high premium.

It is, accordingly, a principal object of the present invention to provide new and improved paint compositions.

It is a further object of this invention to provide novel paint compositions which include halogenated carbon blacks and other pigments.

It is also an object of this invention to provide new halogenated carbon black-containing paint compositions having excellent non-flooding and excellent tinting properties.

It is a still further object of this invention to provide a novel and improved process for preparing certain halogenated carbon blacks which are especially suitable for use as pigments in anti-flooding paint and lacquer compositions.

Other objects and advantages of the invention will be apparent to those skilled in the art from the following detailed description and claims.

Numerous attempts have been made in the prior art to provide a carbon black pigment, which, when mixed with other pigments in a paint composition, would resist flocculation and segregation and thereby avoid the undesirable flooding tendency. However, while some of these carbon black pigments have been useful in reducing the flooding tendency, no carbon black pigment has yet been made available to paint compounders which would not only avoid the flooding problem, but also would contribute good color properties at low and high carbon black loadings. Therefore, a paint compounder using these non-flooding paint compositions previously known to the art pays a premium for the non-flooding characteristic and is forced to employ considerably more pigment in order to obtain acceptably dark gray tones.

In accordance with this invention, it has been found that the above and still further objects are achieved by the utilization of a carbon black halogenated with chlorine, bromine, or iodine as a pigment in the preparation of the present paint compositions.

Generally speaking, the paint compositions of the invention comprise from about 10 to about 60% by weight of said composition of an organic liquid vehicle, from about 0.01 to about 6% by weight of said composition of the above halogenated carbon black pigment, and from about 1 to about 50% by weight of said composition of at least one other pigment. However, it is preferred to use from about 20 to about 60% by weight of the paint composition of an organic liquid vehicle, from about 0.05 to about 4% by weight of said composition of the above halogenated carbon black pigment, and from about 10 to about 40% by weight of said composition of at least one other pigment.

The organic liquid vehicles suitable for use in preparing the present paint compositions include particularly alkyd resins and thermosetting acrylic resins. Alkyd resins as described in "The Condensed Chemical Dictionary" (6th edition, 1961) are generally prepared by the union of dibasic acids or anhydrides, especially phthalic anhydride, with a polybasic alcohol such as glycerine. Modification of the alkyd resins may be accomplished by using other anhydrides such as maleic anhydride, dibasic acids, glycols, polyols or other substances the most common and notable of which are various natural oils or the acids derived therefrom. The use of linseed oil or linoleic acid or similar drying oil materials results in an oxidizing alkyd, while the use of essentially saturated oils and their derivatives produces non-oxidizing alkyd resins. This invention is particularly applicable to short-oil, cocoanut oil, non-drying alkyd resins such as that sold under the trade name Aroplaz 2580X50. Included among the thermosetting acrylic resins are those produced by the polymerization of monomers such as the organic esters of acrylic acid, organic esters of methacrylic acid and derivatives thereof with or without minor amounts of other compatible monomers. Examples of typical resins of this type are ethyl methacrylate, n-butyl methacrylate, methyl acrylate, 2-ethylhexyl acrylate, ethyl acrylate and copolymers thereof such as the copolymer of ethyl methacrylate with methyl methacrylate. Other ingredients which can be included in the acrylic type resin are additional resins such as melamine, styrene, epoxy or other such compatible resins or mixtures of these. In such modified acrylic resins, the proportion of acrylic to melamine, epoxy or other resin may vary depending upon the properties desired in the ultimate product but the acrylic resin generally comprises the major constituent of the total resin. A more complete discussion of the unmodified and modified acrylic type resins useful with the present invention is found in volume 33 (March 1961) of the "Official Digest of the Federation of Societies of Paint Technology" on pages 351 and 353–364. Furthermore, other examples of thermosetting acrylic resins suitable for use with the present invention are those described in a publication by Rohm and Haas Company dated October 1965, and entitled "Acryloid Thermosetting Acrylic Resins." In this publication there are described in detail the characteristics and properties of a series of thermoset acrylic type resins which are crosslinked with nitrogen-containing resins or with epoxy-containing resins and which are sold under the trade mark Acryloid. Of particular applicability to the present invention is a thermosetting acrylic type resin sold under the trade designation Acryloid AT–56 which is fully described on pages 20 and 21 of the above-mentioned publication by Rohm and Haas Company.

The halogenated carbon blacks useful as non-flooding and good tinting pigments with the paint compositions of this invention include carbon blacks treated with a halogen selected from the group consisting of chlorine, bromine and iodine. It has been found most advantageous to utilize chlorine as the halogenating agent and it is, moreover, more economical than the other halogenating agents which may be employed. The carbon blacks that are to be halogenated for the purposes of this invention are the furnace blacks, thermal blacks, and channel blacks. While carbon blacks, generally, are operable in the process of the invention, it is preferred for reasons relating to economics and particle size to employ furnace blacks such as semi-reinforcing furnace blacks (SRF), super abrasion furnace blacks (SAF), high abrasion furnace blacks (HAF), intermediate super abrasion furnace blacks (ISAF), fast extruding furnace blacks (FEF), and fine furnace blacks (FF).

The halogenated carbon blacks of the present invention are readily prepared by several methods. For example, the halogenation process may be carried out by reacting the carbon black with a halogen selected from the group consisting of chlorine, bromine and iodine in either liquid phase or in vapor phase. In the case of a vapor phase reaction, it is suitable to pass the halogenating gas over the carbon black being treated therewith for a period of from about 30 minutes to about 6 hours. The reaction temperature is conveniently maintained below about 100° C. by carrying the halogen gas in a diluting stream of an inert gas such as nitrogen, argon, helium or the like. However, the reaction temperatures, which can vary over a wide range, may be maintained by any of numerous other manipulative techniques known to the art. Indeed, it is not necessary to maintain temperatures at any particular level excepting, of course, the decomposition temperature of the formed products. Temperatures as high as 350° C. have been used without any significant detrimental effect on the properties of halogenated carbon blacks resulting therefrom.

Alternatively, halogenated carbon blacks possessing surprisingly good anti-flooding characteristics may be prepared by carrying out the halogenation of carbon blacks with a saturated solution of a halogen selected from the group consisting of chlorine, bromine and iodine in an organic liquid medium. In this process, the carbon black to be treated may be dispersed in an organic liquid at a temperature ranging from about 0° C. or below to about the boiling point of the liquid for a period of from about 10 minutes to about 6 hours or more. The organic liquid can be selected rather broadly; for example, aliphatic liquids such as hexane, pentane and the like, or aromatic liquids such as benzene, toluene and the like, may be used. However, it is preferred to use halogenated liquids such as the perfluorinated hydrocarbons, chlorinated liquids and the series of halogenated liquids sold under the trade name Kel-F, or the like. Use of these halogenated solvents allows the process for halogenating the carbon black to be carried out free of changes in processing conditions caused by the progressive halogenation of non-halogenated reaction media. A particularly convenient method of halogenating a carbon black involves wetting the surfaces of the carbon black with an organic liquid and then reacting halogen gas with the resultant wetted carbon black. For example, the process is accomplished by passing a stream of nitrogen containing carbon tetrachloride across the surface of a carbon black while agitating the carbon black. After the carbon black is wetted with carbon tetrachloride, chlorine is substituted for the nitrogen and is passed across the wetted carbon black until the desired reaction is completed. The amount of halogenating agent employed in the practice of the invention can be varied within wide limits depending upon the amount of halogenation desired in the resultant carbon black product. Generally speaking, the amount of halogenating agent utilized will be an effective amount which is sufficient to modify the properties of the carbon black product per se so as to impart anti-flooding properties to paint compositions containing the resultant treated carbon black product. More particularly, the amount of chlorine, bromine or iodine gas employed in this invention will be an amount sufficient to produce a halogenated carbon black product containing from about 0.01 to about 4.0 milliequivalents of chlorine, bromine or iodine per gram of carbon black. In a preferred embodiment of the invention, the amount of chlorine, bromine or iodine employed is an amount sufficient to prepare a halogenated carbon black product containing from about 0.1 to about 0.5 milliequivalent of chlorine, bromine or iodine per gram of carbon black.

In addition to the halogenated carbon black pigment, the paint compositions of the present invention include at least one other pigment such as titanium dioxide, lead and zinc pigments.

The invention will be more readily understood by reference to the following examples which describe the advantageous and unexpected results achieved by the use of the halogenated carbon black products of the present invention in the preparation of anti-flooding paint compositions containing the same. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

Pigments subjected to testing procedures in a lacquer system hereinafter described for the purpose of evaluating the physical properties and efficiency thereof include the following:

(1) An intermediate super abrasion furnace (ISAF) carbon black sold under the trade name Vulcan 6 and characterized in having an oil absorption value of about 125 lbs. of oil per 100 lbs. of black and a particle size of about 23 millimicrons, which is used herein as a control.

(2) A pigment comprising a carbon black as described in (1) which is further iodinated in the presence of an organic solvent so that the resultant product contains 0.18 milliequivalent of iodine per gram of carbon black, all of which iodine is in ionic form. This pigment is prepared by stirring the carbon black at a temperature of 25° C. in a saturated solution of iodine in carbon tetrachloride for a period of 2 hours. Excess physically-adsorbed iodine is removed by washing with carbon tetrachloride until a colorless filtrate is obtained. Drying is carried out at a temperature of 100° C. in a forced-draft oven for a period of 20 hours.

(3) A pigment comprising a carbon black as described in (1) which is further chlorinated by a vapor phase process so as to produce a resultant product containing 0.394 milliequivalent of chlorine per gram of carbon black, 0.053 milliequivalent of which chlorine is in ionic form. This pigment is prepared by passing chlorine gas over a period of 4 hours through a reactor equipped with mechanical stirring means which contains therein a previously-dried carbon black. During this period, the temperature rises to 50–60° C. after 15 minutes have elapsed and returns to room temperature after 3 hours. The resultant carbon black product is then purged with nitrogen to remove excess chlorine therefrom and is dried.

(4) A pigment comprising a carbon black as described in (1) which is further chlorinated in the presence of an organic solution so as to yield a product containing 0.27 milliequivalent of chlorine per gram of carbon black, 0.025 milliequivalent of which chlorine is in ionic form. This pigment is prepared by slurrying a carbon black under a positive pressure of chlorine in carbon tetrachloride at a temperature of 30° C. for a period of 2 hours. The resultant product is filtered, washed with carbon tetrachloride to remove physically adsorbed chlorine, and then dried.

(5) A pigment comprising a carbon black as described in (1) which is further brominated in solution so that the resultant product contains 0.270 milliequivalent of bromine per gram of carbon black, 0.037 milliequivalent of which bromine is in ionic form. This pigment is prepared by stirring a carbon black in a 20% solution of bromine in carbon tetrachloride at a temperature of 30° C. for a period of 2 hours. The resultant product is filtered, washed with carbon tetrachloride until a colorless filtrate is obtained, and then dried.

(6) A carbon black pigment sold under the trade designation FR-J1027.

(7) A carbon black pigment as described in (6) is employed; however, the concentration of carbon black pigment used in the paint composition is four times as great as the amount employed in (6).

(8) A carbon black pigment as described in (4) is utilized; however, the concentration of carbon black pigment employed in the paint composition is one-fourth of the amount of carbon black used in (4).

(9) A semireinforcing furnace (SRF) carbon black sold under the trade name Molacco.

(10) A semireinforcing furnace (SRF) carbon black sold under the trade designation Regal SRF-S which is chlorinated so as to yield a product containing 0.06 milli-equivalent of chlorine per gram of carbon black, 0.05 milli-equivalent of which chlorine is in ionic form. This chlorinated carbon black pigment is prepared by treating the carbon black in a chlorine-saturated carbon tetrachloride solution for a period of 30 minutes.

(11) A pigment comprising a semireinforcing furnace (SRF) carbon black which is chlorinated for a period of 30 minutes at a temperature of 0° C. in carbon tetrachloride.

(12) A pigment comprising a semireinforcing furnace (SRF) carbon black which is chlorinated for a period of 6 hours at room temperature in carbon tetrachloride.

For purposes of this invention, the term "ionic halogen" is defined as that halogen removable by shaking a halogenated carbon black for a period of 24 hours in 1 normal sodium hydroxide. The carbon black so treated is certrifuged and the liquid centrate is analyzed for its halogen content by a Volhard analysis.

The above-enumerated carbon black pigments, as will become apparent hereinafter, demonstrate generally the superior anti-flooding and color characteristics imparted to paint compositions by halogenated carbon blacks. Moreover, the above-described pigments demonstrate the surprising and unexpected advantages attributable to the presence of halogenated carbon blacks, especially those prepared in an organic solvent media, in paint compositions containing said pigments. Furthermore, the above-described pigments demonstrate that the excellent anti-flooding characteristic of halogenated carbon black pigments is far less dependent on the amount of carbon black pigment in the paint composition than is the anti-flooding property of the best anti-flooding pigments heretofore known to the prior art. While the reason for the superior performance exhibited by halogenated carbon black pigments, and particularly those which are prepared by a solvent process, is not known precisely, it is believed that the superior performance is related in some instances to the larger quantities of hydrogen left undistrubed on the surfaces of the carbon black pigment when the solvent type halogenation process is used. However, it is not intended that this invention be limited in any way by or to such theoretical reasoning and explanation.

A standard paste formulation employed with the testing procedures used in evaluating the physical properties and efficiency of the pigments described in the working examples is prepared by admixing the following ingredients for a period of 18 hours in a one-quart porcelain ball mill with 500 grams of ¾″ and ½″ balls:

| | Grams |
|---|---|
| Titanium Dioxide (R-500) | 136.0 |
| Pigment from working example | 2.54 |
| Aroplaz 2580X50 | 85.0 |
| Xylol | 42.0 |

This ball-milled mixture is then let down on a laboratory roll mix with the following additional ingredients.

| | Grams |
|---|---|
| Aroplaz 2580X50 | 340.0 |
| Resimene 876 | 105.0 |
| Solvesso 150 | 59.5 |
| Triethylamine | 0.85 |

The viscosity of the resulting milled paste formulation is then reduced by dilution with a high-boiling aromatic solvent sold under the trade designation Solvesso 150, to 23 seconds (No. 4 Ford Cup) for dip-coating applications, and to 17 seconds (No. 4 Ford Cup) for spray-coating applications. In the above paste formulation, Resimene 876 is a trade name for a butylated melamine resin, and as stated hereinbefore, Aroplaz 2580X50 is a trade name for a short-oil, cocoanut oil non-drying alkyd resin.

The anti-flooding properties of the various pigments are evaluated by spray-coating two metal panels with the particular paint composition to be tested, such as an enamel, drying the paint composition, adjusting the viscosity of the paint composition so as to be suitable for dip-coating applications, and dip-coating one-half of each panel with the paint composition. In this manner, the surface of each panel has a dip-coated portion and a spray-coated portion, and the flooding factors are determined by comparing the difference in color between the spray-coated portion and the dip-coated portion of the surfaces of the panels. These color properties, i.e., flooding factors, of each of the paint compositions are determined using a tristimulus colorimeter known as the "Coloreye" produced by Instrument Development Laboratories, Inc., of Attleboro, Mass., and described in detail in their "Instruction Manual No. 1000 G for Model D Coloreye."

More particularly, the "Coloreye" measures light reflectance of a sample compared to a standard at three wavelengths in the visible light spectrum. The three wavelengths are designated as X, Y and Z and are substantially amber, green and blue wavelengths respectively. A lower reflectivity reading, which indicates greater absorption and darker color, is not a parameter of prime importance regarding anti-flooding aspects where the relative colors of a spray-coated surface and a dip-coated surface are being evaluated rather than an absolute color. Nevertheless, the "Coloreye" data for each of the three wavelengths is given below for each of the paint compositions prepared with the aforementioned pigments. It is emphasized, however, that experience has shown that in measuring the flooding effect, the Y-value obtained on the "Coloreye" is most important.

The "Coloreye" instrument can be utilized to present a number of other qualitative assessments of color value. In this application, the jetness of a pigment, or, more accurately, the jetness which a pigment contributes to a paint composition is evaluated in terms of the "Y" value. The blueness contributed by a pigment is measured in terms of a "Yellowness Factor" which is mathematically described as $$\frac{(X \text{ value} - Z \text{ value})}{Y \text{ value}} \times 100$$

Lower yellowness factors are indicative of a desirably bluer tone imparted to a paint composition by a pigment.

Accordingly, the Flooding Factor listed in Table I below is a measurement of the difference in light reflectance (Y value) of a surface spray-coated with a paint composition such as an enamel compared to light reflectance of a surface dip-coated with the same paint composition. The light reflectance of the surface dip-coated with the paint composition is arbitrarily assigned a value of 100%. The Yellowness Factor, on the other hand, is determined with reference to the carbon black pigment designated as Black No. 6 in the table as a color standard.

The following Table I is divided into two sections, namely, a section relating to the measurement of the flooding properties of the various paint compositions, and a section relating to the measurement of the color properties of the various paint compositions.

in other paint compositions, such a pigment is incorporated into the following paint formulation which contains a thermosetting acrylic resin sold under the trade designation Acryloid AT–56, as hereinbefore described.

Mill paste

| | Grams |
|---|---|
| $TiO_2$ | 136.0 |
| AT–56 | 100 |
| Black No. 11 | 2.54 |
| Xylol | 25.4 |

Reduction

| | Grams |
|---|---|
| AT–56 | 320 |
| Xylol | 85 |
| Cellosolve acetate | 42.5 |
| Resimene 876 | 180.0 |

The values obtained for Flooding Factor, blueness and jetness are all superior to a paint composition as described above wherein the control Black No. 6 is substituted for the Black No. 11.

While this invention has been described with respect to certain embodiments, it is not so limited, and it should be understood that variations and modifications thereof

TABLE I

| Sample | Color eye reading (flooding) | | | Color eye reading | | | | Yellowness factor |
|---|---|---|---|---|---|---|---|---|
| | Y-dip | Y-spray | Flooding factor | X | Y | Z | Color | |
| Black No.: | | | | | | | | |
| 1 | 100 | 86.1 | 13.9 | 60.4 | 61.0 | 64.7 | | −7.05 |
| 2 | 100 | 102.3 | 2.3 | 56.7 | 57.1 | 60.3 | | −6.30 |
| 3 | 100 | 102.7 | 2.7 | 57.2 | 57.6 | 61.0 | | −6.60 |
| 4 | 100 | 99.6 | 0.4 | 57.8 | 58.2 | 61.5 | | −6.36 |
| 5 | 100 | 91.8 | 8.2 | 57.3 | 57.6 | 60.6 | | −5.73 |
| 6 | 100 | 99.9 | 0.1 | 100.0 | 99.9 | 100.1 | | 0.0 |
| 7 | 100 | 111.8 | 11.8 | 47.3 | 47.4 | 49.3 | | −4.2 |
| 8 | 100 | 96.8 | 3.2 | 108.4 | 108.8 | 109.3 | | −0.83 |
| 9 | 100 | 80.4 | 19.6 | | | | | |
| 10 | 100 | | 1.2 | | 66.1 | | | −10.4 |
| 11 | | 70.1 | 0.8 | | | | | −10.0 |
| 12 | | 72.6 | 1.6 | | | | | −9.5 |

A study of the data contained in the above Table I reveals not only that carbon black pigments prepared in accordance with this invention have improved anti-flooding characteristics as shown in the cases of Samples Nos. 2, 3, 4, 5 and 10, but also that only a relatively small change in the anti-flooding property is realized in the instance where large changes in the amount of carbon black pigment in the paint compositions are made. In regard to this point, Samples Nos. 4 and 8, showing a four fold change in the amount of a carbon black pigment of this invention in a paint composition may be compared to Samples Nos. 6 and 7 showing a four fold change in the amount of an excellent anti-flooding pigment known to the art in the same paint composition. The comparison reveals only a small change in the Flooding Factors for the carbon black pigments of the present invention whereas a large change in the Flooding Factors for the pigments previously known in the art is shown. It is, furthermore, obvious from the data above that the color properties of the carbon black pigments prepared according to this invention are also advantageously improved. This superior blue tone is shown by a review of the Yellowness Factor values which are much lower for each carbon black pigment prepared according to this invention than the value obtained for the pigment of Sample No. 6, used herein as a reference standard. Moreover, the superior jetness of the pigments of this invention is revealed by the lower reflectivity values of the paint compositions prepared with the pigments of this invention in contrast to the reflectivity values of paint compositions prepared with good anti-flooding materials known to the art.

To illustrate the applicability of the halogenated carbon blacks of the invention as useful antiflooding pigments may be made which are obvious to those skilled in the art without departing from the spirit or scope of the invention.

The embodiments of the invention in which an exclusive property or privilege is claimed are defined as follows:

1. A gray lacquer composition having good anti-flooding characteristics comprising from about 10 to about 60% by weight of said composition of an organic liquid vehicle, from about 0.01 to about 6% by weight of said composition of a halogenated carbon black pigment containing from about 0.01 to about 4.0 milliequivalents of a halogen in ionic form selected from the group consisting of chlorine, bromine and iodine per gram of carbon black, and from about 1 to about 50% by weight of said composition of at least one other pigment.

2. A composition as defined in claim 1 wherein said organic liquid vehicle is present in amounts of from about 20 to about 60% by weight of said composition.

3. A composition as defined in claim 2 wherein said halogenated carbon black pigment is present in amounts of from about 0.05 to about 4% by weight of said composition, and said other pigment is present in amounts of from about 10 to about 40% by weight of said composition.

4. A composition as defined in claim 2 wherein said halogenated carbon black pigment contains from about 0.1 to about 0.5 milliequivalent of a halogen in ionic form selected from the group consisting of chlorine, bromine and iodine per gram of carbon black.

5. A composition as defined in claim 1 wherein said organic liquid vehicle is a thermosetting acrylic resin-based vehicle.

6. A composition as defined in claim 1 wherein said organic liquid vehicle is an alkyd resin-based vehicle.

7. A composition as defined in claim 1 wherein said halogen is chlorine.

References Cited
UNITED STATES PATENTS

| | | | |
|---|---|---|---|
| 2,408,696 | 10/1946 | Smallwood | 106—307 |
| 3,140,192 | 7/1964 | Jordan et al. | 106—307 |
| 3,251,704 | 5/1966 | Nellessen | 106—193 |
| 3,260,609 | 7/1966 | Reeser | 106—263 |
| 3,340,081 | 9/1967 | Teter | 106—307 |
| 3,342,554 | 9/1967 | Jordan et al. | 23—209.2 |
| 3,431,074 | 3/1969 | Jordan | 23—209.3 |

DONALD E. CZAJA, Primary Examiner

R. W. GRIFFIN, Assistant Examiner

U.S. Cl. X.R.

117—132R, 132B, 161K, 161UC; 260—33.2R, 37P, 40R, 41R